US012462828B2

(12) United States Patent
Lund et al.

(10) Patent No.: US 12,462,828 B2
(45) Date of Patent: Nov. 4, 2025

(54) PERSONALIZED BANDWIDTH EXTENSION

(71) Applicant: GN Audio A/S, Ballerup (DK)

(72) Inventors: Rasmus Kvist Lund, Ballerup (DK); Pejman Mowlaee, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 156 days.

(21) Appl. No.: 18/334,067

(22) Filed: Jun. 13, 2023

(65) Prior Publication Data

US 2024/0005930 A1 Jan. 4, 2024

(30) Foreign Application Priority Data

Jul. 4, 2022 (EP) .................................... 22182783

(51) Int. Cl.
*G10L 21/038* (2013.01)
*G10L 19/02* (2013.01)
*G10L 19/22* (2013.01)
*G10L 19/00* (2013.01)

(52) U.S. Cl.
CPC ............ *G10L 21/038* (2013.01); *G10L 19/02* (2013.01); *G10L 19/22* (2013.01); *G10L 2019/0004* (2013.01)

(58) Field of Classification Search
CPC .............................. G10L 19/02; G10L 21/038
See application file for complete search history.

(56) References Cited

U.S. PATENT DOCUMENTS 9,319,510 B2 * 4/2016 Kim ...................... G10L 21/038
11,985,179 B1 * 5/2024 Tacer ...................... G10L 21/00
2005/0086058 A1 * 4/2005 Lemelson ................ H04R 5/04 381/317
2014/0233725 A1 * 8/2014 Kim ........................ H04M 3/22 379/414
2018/0040336 A1 * 2/2018 Wu ......................... G10L 19/26
2020/0243102 A1 * 7/2020 Schmidt .................. G10L 19/02
2021/0051422 A1 * 2/2021 Clark ................... A61B 5/0022
2021/0082444 A1 * 3/2021 Fejgin ................... G10L 19/022
2021/0166705 A1 * 6/2021 Chang ................... G10L 19/038
2023/0016637 A1 * 1/2023 Schmidt ................. G06N 3/045
2023/0421701 A1 * 12/2023 Griffin .................. H04M 3/567

FOREIGN PATENT DOCUMENTS

WO 2014126933 A1 8/2014
WO 2021207131 A1 10/2021

OTHER PUBLICATIONS

J. D. Johnston, "Estimation of perceptual entropy using noise masking criteria," ICASSP-88., International Conference on Acoustics, Speech, and Signal Processing, New York, NY, USA, 1988, pp. 2524-2527 vol.5, doi: 10.1109/ICASSP.1988.197157.

(Continued)

*Primary Examiner* — Shaun Roberts
(74) *Attorney, Agent, or Firm* — HSML P.C.

(57) ABSTRACT

A method for personalized bandwidth extension in an audio device. The method comprises obtaining an input microphone signal with a first bandwidth, obtaining a first user parameter indicative of one or more characteristics of a user of the audio device, determining, based on the first user parameter, a bandwidth extension model, and generating an output signal with a second bandwidth by applying the determined bandwidth extension model to the input microphone signal.

7 Claims, 5 Drawing Sheets

(56) References Cited

OTHER PUBLICATIONS

M. Dietz et al., "Overview of the EVS codec architecture," 2015 IEEE International Conference on Acoustics, Speech and Signal Processing (ICASSP), South Brisbane, QLD, Australia, 2015, pp. 5698-5702, doi: 10.1109/ICASSP.2015.7179063.
K. Zhen, M. S. Lee, J. Sung, S. Beack and M. Kim, "Psychoacoustic Calibration of Loss Functions for Efficient End-to-End Neural Audio Coding," in IEEE Signal Processing Letters, vol. 27, pp. 2159-2163, 2020, doi: 10.1109/LSP.2020.3039765.
The extended European search report issued in European Application No. 22182783.5, dated Dec. 5, 2022.
Larsen et al., "Efficient High-frequency Bandwidth Extension of Music and Speech", 112th Audio Engineering Society Convention Paper, New York, NY, US No. 5627, May 10, 2022 pp. 1-5 XP002499622.
B. Feng, Z. Jin, J. Su and A. Finkelstein, "Learning Bandwidth Expansion Using Perceptually-motivated Loss," ICASSP 2019—2019 IEEE International Conference on Acoustics, Speech and Signal Processing (ICASSP), Brighton, UK, 2019, pp. 606-610, doi: 10.1109/ICASSP.2019.8682367.
Liu et al., "Audio bandwidth extension using ensemble of recurrent neural networks", EURASIP Journal on Audio, Speech, and Music Processing, 2016, 12 (2016). https://doi.org/10.1186/s13636-016-0090-0.

* cited by examiner

PERSONALIZED BANDWIDTH EXTENSION

TECHNICAL FIELD OF INVENTION

The present disclosure relates to methods for performing personalized bandwidth extension on an audio signal, and related audio devices configured for carrying out the methods.

BACKGROUND

Bandwidth extension of signals is a well-known technique used in expanding the frequency range of a signal. Bandwidth extension is a solution often used to generate the missing content of a signal or to restore deteriorated content of a signal. The missing or deteriorated content may occur as the result of a communication channel, signal processing, background noise or jammer signals.

Audio codecs is one place where bandwidth extension is utilized. For example, when an audio signal is transmitted from a far-end station the audio signal may be encoded to a limited bandwidth to save bandwidth over the transmission channel, and at the near-end station, bandwidth extension is utilized to bandwidth extend the received encoded signal.

A purpose of bandwidth extension is to improve the perceived sound quality for the end user. It may also be used to generate new content to replace parts of a signal dominated by noise, thus providing for a certain level of denoising.

Most implementations of previously presented methods for bandwidth extension such as spectral band replication (SBR) or the approach used in the G.729.1 codec uses a generalized approach, where a one size fits all mentality is employed. Such generalized approach may lead to a sub-optimal user experience. Attempts have been made to arrive at a more personalized bandwidth extension model.

WO 2014126933 A1 discloses a personalized (i.e., speaker-derivable) bandwidth extension in which the model used for bandwidth extension is personalized (e.g., tailored) to each specific user. A training phase is performed to generate a bandwidth extension model that is personalized to a user. The model may be subsequently used in a bandwidth extension phase during a phone call involving the user. The bandwidth extension phase, using the personalized bandwidth extension model, will be activated when a higher band (e.g., wideband) is not available and the call is taking place on a lower band (e.g., narrowband).

WO 20211207131 A1 discloses an ear-wearable electronic device operable to apply a low-pass filter to a digitized voice signal to remove a high-frequency component and obtain a low-frequency component. Speech enhancement is applied to the low-frequency component. Blind bandwidth extension is applied to the enhanced low-frequency component to recover or synthesize an estimate of at least part of the high frequency component. An enhanced speech signal is output that is a combination of the enhanced low-frequency component and the bandwidth-extended high frequency component.

Larsen, Erik, Ronald M. Aarts, and Michael Danessis. "Efficient high-frequency bandwidth extension of music and speech." Audio Engineering Society Convention 112. Audio Engineering Society, 2002, discloses an efficient algorithm for extending the bandwidth of an audio signal, with the goal to create a more natural sound. This is done by adding an extra octave at the high frequency part of the spectrum. The algorithm uses a non-linearity to generate the extended octave, and can be applied to music as well as speech. This also enables application to fixed or mobile communication systems.

However, even such a solution allows room for improvement in providing an optimal user experience.

SUMMARY

Accordingly, there is a need for audio devices and associated methods with improved bandwidth extension.

According to a first aspect of the present disclosure there is provided a method for personalized bandwidth extension in an audio device, where the method comprises:

a. obtaining an input microphone signal with a first bandwidth,
b. obtaining a first user parameter comprising a result of a hearing test carried out on a user of the audio device and/or physiological information regarding the user of the audio device, such as gender and/or age,
c. determining based on the first user parameter a bandwidth extension model, wherein the bandwidth extension model comprises a trained neural network, wherein the trained neural network is trained according to the second aspect of the present disclosure, and
d. generating an output signal with a second bandwidth by applying the determined bandwidth extension model to the input microphone signal.

Hence, the proposed method provides a method for bandwidth extending an audio signal with the user of the audio device in mind. Such a solution provides a more personalized solution which caters to the person who needs to listen to the audio signal, and thus allows for optimizing the perceived sound quality with regards to the user of the audio device. Furthermore, such a solution may also optimize the use of processing power as processing power is not wasted on information, which is irrelevant for the user, e.g., wasting processing power by generating perceptually irrelevant information.

In an embodiment, the audio device is configured to be worn by a user. The audio device may be arranged at the user's ear, on the user's ear, over the user's ear, in the user's ear, in the user's ear canal, behind the user's ear and/or in the user's concha, i.e., the audio device is configured to be worn in, on, over and/or at the user's ear. The user may wear two audio devices, one audio device at each ear. The two audio devices may be connected, such as wirelessly connected and/or connected by wires, such as a binaural hearing aid system.

The audio device may be a hearable such as a headset, headphone, earphone, earbud, hearing aid, a personal sound amplification product (PSAP), an over-the-counter (OTC) audio device, a hearing protection device, a one-size-fits-all audio device, a custom audio device or another head-wearable audio device. The audio device may be a speakerphone or a soundbar. Audio devices can include both prescription devices and non-prescription devices.

The audio device may be embodied in various housing styles or form factors.

Some of these form factors are earbuds, on the ear headphones or over the ear headphones. The person skilled in the art is aware of different kinds of audio devices and of different options for arranging the audio device in, on, over and/or at the ear of the audio device wearer. The audio device (or pair of audio devices) may be custom fitted, standard fitted, open fitted and/or occlusive fitted.

In an embodiment, the audio device may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

In an embodiment, the audio device may comprise one or more antenna(s) configured for wireless communication. The one or more antenna(s) may comprise an electric antenna. The electric antenna may be configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHz. The second frequency may be between 9 MHz and 15 MHz.

In an embodiment, the audio device may comprise one or more wireless communication unit(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The audio device may be configured for wired/wireless audio communication, e.g., enabling the user to listen to media, such as music or radio and/or enabling the user to perform phone calls.

In an embodiment, the wireless signal may originate from one or more external source(s) and/or external devices, such as spouse microphone device(s), wireless audio transmitter(s), smart computer(s) and/or distributed microphone array(s) associated with a wireless transmitter. The wireless input signal(s) may origin from another audio device, e.g., as part of a binaural hearing system and/or from one or more accessory device(s), such as a smartphone and/or a smart watch.

In an embodiment, the audio device may include a processing unit. The processing unit may be configured for processing the first and/or second electric input signal(s). The processing may comprise compensating for a hearing loss of the user, i.e., apply frequency dependent gain to input signals in accordance with the user's frequency dependent hearing impairment. The processing may comprise performing feedback cancelation, echo cancellation, beamforming, tinnitus reduction/masking, noise reduction, noise cancellation, speech recognition, bass adjustment, treble adjustment and/or processing of user input.

The processing unit may be a processor, an integrated circuit, an application, functional module, etc. The processing unit may be implemented in a signal-processing chip or a printed circuit board (PCB). The processing unit may be configured to provide a first electric output signal based on the processing of the first and/or second electric input signal(s). The processing unit may be configured to provide a second electric output signal. The second electric output signal may be based on the processing of the first and/or second electric input signal(s).

In an embodiment, the audio device may comprise an output transducer. The output transducer may be coupled to the processing unit. The output transducer may be a loudspeaker. The output transducer may be configured for converting the first electric output signal into an acoustic output signal. The output transducer may be coupled to the processing unit via the magnetic antenna.

In an embodiment, the wireless communication unit may be configured for converting the second electric output signal into a wireless output signal. The wireless output signal may comprise synchronization data. The wireless communication unit may be configured for transmitting the wireless output signal via at least one of the one or more antennas.

In an embodiment, the audio device may comprise a digital-to-analogue converter configured to convert the first electric output signal, the second electric output signal and/or the wireless output signal into an analogue signal.

In an embodiment, the audio device may comprise a vent. A vent is a physical passageway such as a canal or tube primarily placed to offer pressure equalization across a housing placed in the ear such as an ITE audio device, an ITE unit of a BTE audio device, a CIC audio device, a RIE audio device, a RIC audio device, a MaRIE audio device or a dome tip/earmold. The vent may be a pressure vent with a small cross section area, which is preferably acoustically sealed. The vent may be an acoustic vent configured for occlusion cancellation. The vent may be an active vent enabling opening or closing of the vent during use of the audio device. The active vent may comprise a valve.

In an embodiment, the audio device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

In an embodiment, the audio device may comprise a memory, including volatile and non-volatile forms of memory.

The audio device may be configured for audio communication, e.g., enabling the user to listen to media, such as music or radio, and/or enabling the user to perform phone calls.

The audio device may comprise one or more antennas for radio frequency communication. The one or more antennas may be configured for operation in ISM frequency band. One of the one or more antennas may be an electric antenna. One or the one or more antennas may be a magnetic induction coil antenna. Magnetic induction, or near-field magnetic induction (NFMI), typically provides communication, including transmission of voice, audio, and data, in a range of frequencies between 2 MHz and 15 MHz. At these frequencies, the electromagnetic radiation propagates through and around the human head and body without significant losses in the tissue.

The magnetic induction coil may be configured to operate at a frequency below 100 MHz, such as at below 30 MHz, such as below 15 MHz, during use. The magnetic induction coil may be configured to operate at a frequency range between 1 MHz and 100 MHz, such as between 1 MHz and 15 MHz, such as between 1 MHz and 30 MHz, such as between 5 MHz and 30 MHz, such as between 5 MHz and 15 MHz, such as between 10 MHz and 11 MHz, such as between 10.2 MHz and 11 MHz. The frequency may further include a range from 2 MHz to 30 MHz, such as from 2 MHz to 10 MHz, such as from 2 MHz to 10 MHz, such as from 5 MHz to 10 MHz, such as from 5 MHz to 7 MHz.

The electric antenna may be configured for operation at a frequency of at least 400 MHz, such as of at least 800 MHz, such as of at least 1 GHz, such as at a frequency between 1.5 GHz and 6 GHz, such as at a frequency between 1.5 GHz and 3 GHz such as at a frequency of 2.4 GHz. The antenna may be optimized for operation at a frequency of between 400 MHz and 6 GHz, such as between 400 MHz and 1 GHz, between 800 MHz and 1 GHz, between 800 MHz and 6 GHz, between 800 MHz and 3 GHz, etc. Thus, the electric antenna may be configured for operation in ISM frequency band. The electric antenna may be any antenna capable of operating at these frequencies, and the electric antenna may be a resonant antenna, such as monopole antenna, such as a dipole antenna, etc. The resonant antenna may have a length of $\lambda/4\pm10\%$ or any multiple thereof, A being the wavelength corresponding to the emitted electromagnetic field.

In the context of the present disclosure, the term personalized or personalizing is to be construed as something being done to cater to the user using the audio device, e.g., a user wearing a headset where audio being played through the headset is processed based on one or more characteristics of the user wearing the headset. A personalized bandwidth extension model may for example have defined an upper and/or lower perceivable threshold for the user, i.e., a threshold frequency for which the user will be able to perceive sound, such thresholds may then define the extent to which bandwidth extension is performed, e.g., if the user cannot perceive frequencies above 14 kHz there is no reason to bandwidth extend an incoming signal to 20 kHz, therefore a personalized bandwidth extension model may be limited to 14 kHz.

The input microphone signal may be obtained in a plurality of manners. The input microphone signal may be received from a far-end station. The input microphone signal may be retrieved from a local storage on the audio device.

The input microphone signal may be an audio signal recorded at a far-end station. The input microphone signal may be a TX signal recorded at another audio device, and subsequently transmitted to the audio device. The input microphone signal may be a media signal. A media signal may be a signal representative of a song or audio of a movie. The input microphone signal may be voice signal recorded during a phone call or another communication session between two or more parties. The input microphone signal may be a pre-recorded signal. The input microphone signal may be a signal obtained in real-time, e.g., the input microphone signal being part of an on-going phone conversation.

The input microphone signal having a first bandwidth is to be interpreted as the input microphone signal being fully or at least mostly represented within the first bandwidth, e.g., all user relevant audio content of the signal being present within the first bandwidth.

The first bandwidth may be a frequency range within which the input microphone signal is represented. The first bandwidth may be a narrow band, hence the input microphone signal being a narrow band signal. The first bandwidth may be a bandwidth of 300 Hz to 3.4 kHz, such a bandwidth is supported by several communication standards. The first bandwidth may be a bandwidth of 50 Hz to 7 kHz, also known as wideband. The first bandwidth may be a bandwidth of 50 Hz to 14 kHz, also known as super wideband. The first bandwidth may be a bandwidth of 50 Hz to 20 kHz, also known as full band. The first bandwidth may comprise a plurality of bandwidth ranges, e.g., the first bandwidth may comprise two bandwidth ranges 50 Hz to 1 kHz, and 2 kHz to 7 kHz.

The second bandwidth may be a broader bandwidth than the first bandwidth. The second bandwidth may be a narrower bandwidth than the first bandwidth. The second bandwidth may comprise a plurality of bandwidth ranges, e.g., if the user of the audio device has a notch hearing loss in the frequency range of 3 kHz to 6 kHz, the second bandwidth may then comprise two bandwidth ranges from 50 Hz to 3 kHz and 6 kHz to 7 kHz thereby providing a personalized bandwidth based on the hearing loss of the user of the audio device. The second bandwidth may be a bandwidth optimized for the user of the audio device for the given input microphone signal, based on the first user parameter. The second bandwidth may a bandwidth selected to optimize the audio quality for the user of audio device, based on the first user parameter. A manner to optimize the audio quality is to optimize an audio quality parameter of the input microphone signal, such as a MOS score or similar.

The first user parameter may be obtained by receiving one or more inputs from a user of the audio device. The first user parameter may be obtained by retrieving the first user parameter from a local storage on the audio device, such as a flash drive. The first user parameter may be obtained by retrieving the first user parameter from an online profile of the user, e.g., a user profile stored on a cloud.

The one or more characteristics of the user of the audio device may be related to a user's usage of the audio device, e.g., if the user prefer a high gain on bass or treble. The one or more characteristics of the user may be related to the user themselves, e.g., a hearing loss, physiological data, a wear style of the audio device, or other.

The bandwidth extension model is a model configured for generating an output signal with a second bandwidth, based on the input microphone signal with the first bandwidth. The bandwidth extension model may generate the output signal by generating spectral content to the input microphone signal, e.g., adding spectral content to the received input microphone signal. The bandwidth extension model may generate the output signal by generating spectral content based on the input microphone signal, e.g., fully generating a new signal based on the input microphone signal. The bandwidth extension model used by the audio device is personalized, i.e., determined based on the user of the audio device. The bandwidth extension model may be configured to generate spectral content based on the input microphone signal. The bandwidth extension model may be configured to generate spectral content, based on the first user parameter and the input microphone signal. The bandwidth extension model may be configured to generate spectral content to maximize perceptually relevant information (PRI), based on the first user parameter and the input microphone signal. PRI may for example be calculated based on the perceptual entropy, as outlined in D. Johnston, "Estimation of Perceptual Entropy Using Noise Masking Criteria," Proc. Int. Conf. Audio Speech Signal Proc. (ICASSP), pp 2524-2527 (1988). Thus, the bandwidth extension model may perform bandwidth extension to optimize the perceptual entropy of the input microphone signal for the user of the audio device. The bandwidth model may be configured to generate the output signal with a second bandwidth to thereby maximize perceptually relevant information (PRI) for the user of the audio device. The bandwidth extension model may be configured to generate spectral content based on the input microphone signal, the audible range, and levels of the user of the audio device. The audible range may be defined as one or more frequencies ranges within which the user of the audio device may be able to perceive an audio signal being played back, e.g., as a standard the audible range for a person with perfect hearing is generally defined as being from 20 Hz to 20 kHz, however, it has been found there is large individual variations due to different hearing losses. The audible levels of the user of the audio device may be defined by masking thresholds within an audio signal, where the masking thresholds defines masked and unmasked components within an audio signal. The audible levels may be defined within different frequency bins.

PRI and/or the audible range and levels for a user may be determined based on the first user parameter.

The bandwidth extension model may be determined by a mapping function, where the mapping function maps different first user parameters to different bandwidth extension models. The different bandwidth extension models may be pre-generated models. The mapping function may also take into consideration additional parameters, such as the first bandwidth of the input microphone signal. The bandwidth extension model may be determined/generated in real-time based on an obtained first user parameter. The bandwidth extension model may be stored locally on the audio device. The bandwidth extension model may be stored in a cloud location, where the audio device may retrieve the bandwidth extension model. A plurality of bandwidth extension models may be stored locally on the audio device or in a cloud location.

The output signal may be an audio signal to be played back to a user of the audio device. The output signal may be a signal subject to undergo further processing.

Generating the output signal may involve giving the input microphone signal as an input to the determined bandwidth extension model, where the output of the determined bandwidth extension model will be the output signal.

In an embodiment the first user parameter comprises physiological information regarding the user of the audio device, such as gender and/or age.

Several studies have shown that hearing loss is well correlated with physiological parameters, such as age and gender. Thus, by obtaining relatively simple information regarding a user of the hearing device a personalization of the bandwidth extension model may be performed based on such information. For example, based on the physiological information an estimation of the user's hearing profile may be made, which in turn may be used for determining the audible range and levels for the user and/or PRI. The audible levels may be determined based on the input microphone signal and the user's hearing profile. Physiological information regarding the user may be obtained by asking the user to input the information via an interface, such as a smart device communicatively connected to the audio device. The physiological information regarding the user may comprise demographic information.

In an embodiment the first user parameter comprises the result of a hearing test carried out on the user of the audio device.

Consequently, the bandwidth extension model may cater to the actual hearing profile of the user of the audio device. The result of the hearing test may for example be an audiogram. The bandwidth extension model may be generated based on the hearing profile of the user of the audio device.

In an embodiment the step c. comprises:

obtaining a codebook comprising a plurality of bandwidth extension models each associated with one or more user parameters, comparing the first user parameter to the codebook, and determining based on the comparison between the codebook and the first user parameter the bandwidth extension model.

The codebook may be stored locally or on a cloud storage. The codebook may be part of an audio codec used for transmitting the input microphone signal. The codebook stores a plurality of bandwidth extension models, each bandwidth extension model may be associated with one or more user parameters.

Comparing the first user parameter with the codebook may comprise comparing the first user parameter to the one or more user parameters associated with each bandwidth extension model, to thereby determine the one or more user parameters matching the most with the first user parameter, and subsequently selecting the bandwidth extension model associated with the one or more user parameters matching the most with the first user parameter.

The one or more user parameters may be physiological information, such as gender and/or age. The one or more user parameters may be hearing profiles, such as results of hearing tests, e.g., audiograms.

The plurality of bandwidth extension models comprised in the codebook may be predetermined bandwidth extension models, which have been generated based on the one or more user parameters. For example, one bandwidth extension model may be associated with being 30 years old, the associated bandwidth extension model may have been generated based on the average hearing profile of a person being 30 years old, e.g., by assessing the audible range and levels of a 30-year-old person.

In an embodiment the method comprises analysing the input microphone signal to determine the first bandwidth, and determining, based on the first user parameter and the determined first bandwidth, the bandwidth extension model.

The determined first bandwidth may be given to a mapping function together with the first user parameter, the mapping function may then map the determined first bandwidth and the first user parameter to a bandwidth extension model. Each pre-generated bandwidth extension model may be associated with different bandwidths, e.g., different bandwidth model may be configured for performing bandwidth extension for different input bandwidths.

The first bandwidth may be determined by a bandwidth detector. Bandwidth detectors are known within the field of signal processing, for example, the EVS codec utilizes bandwidth detectors, further, information may be found in M. Dietz et al. "Overview of the EVS codec architecture", ICASSP 2015, pp. 5698-5702, and Audio Bandwidth Detection in EVS codec, Symposium on 3GPP Enhanced Voice Series (GlobalSIP), 2015. Another example of a bandwidth detector can be found in the LC3 codec, cf., Digital Enhanced Cordless Telecommunications (DECT); Low Complexity Communication Codec plus (LC3plus), Technical Specification, ETSI TS 103 634, 2021.

The determined first bandwidth may also be compared to a codebook comprising a plurality of bandwidth extension models, wherein the plurality of bandwidth extension models are grouped according to different bandwidths. The selection may then happen based on comparing the determined first bandwidths to the different groups of bandwidth extension model.

In an embodiment the bandwidth extension model defines a target bandwidth, and wherein the step d. comprises:

generating an output signal with the target bandwidth using the determined bandwidth extension model.

The target bandwidth may be determined based on an audible frequency range for the user of the audio device.

The neural network may be a general regression neural network (GRNN), a generative adversarial network (GAN), a convolutional neural network (CNN), etc.

The neural network may be trained to bandwidth extend an input microphone signal with a first bandwidth to a second bandwidth to maximize the amount of perceptually relevant information for the user of the audio device. The neural network and training of the neural network will be explained further in-depth in relation to the second aspect and the detailed description of the present disclosure.

In an embodiment the first user parameter is stored on a local storage of the audio device, and wherein the step b. comprises:

reading the first user parameter on the local storage.

The user of the audio device may have a profile stored on the audio device, as part of creating the profile the user of the audio device may associate one or more first user parameters with the profile. Hence, when the user initiates the audio device the user may select their profile to thereby allow for personalized signal processing based on the selected profile.

In an embodiment the step a. comprises:

receiving the input microphone signal from a far-end station, wherein the received input microphone signal from the far-end station is an encoded signal, and wherein the steps b. to d. is carried out as part of decoding the input microphone signal from the far-end station.

The input microphone signal may be encoded to optimize the usage of a bandwidth over a communication channel. The input microphone signal may be encoded in accordance with one or more audio codecs, e.g., MPEG-4 Audio, or Enhanced Voice Service (EVS).

In an embodiment the method comprises:

establishing a communication connection with a far-end station, transmitting the first user parameter to the far-end station, and receiving the encoded input microphone signal from the far-end station, wherein the input microphone signal comprises the first user parameter, and wherein step b) comprises:

determining the first user parameter from the received input microphone signal.

During the establishment of the communication connected with the far-end station a handshake procedure may be undertaken where information is exchanged between the near-end station and the far-end station to configure the communication channel. As part of the information exchange the first user parameter may be transmitted to the far-end station, thus, allowing for the far-end station to encode a transmitted signal with the first user parameter. When the first user parameter is encoded with the transmitted signal a decoder at the near-end side may utilize the first user parameter without having to receive the first user parameter from another source, such as a local storage or a cloud location.

According to a second aspect of the present disclosure, there is provided a computer-implemented method for training a bandwidth extension model for personalized bandwidth extension, wherein the method comprises:

obtaining an audio dataset comprising one or more first audio signals with a first bandwidth, obtaining a hearing dataset comprising a user hearing profile, applying the bandwidth extension model to the plurality of first audio signals to generate a plurality of bandwidth extended audio signals, determining a plurality of perceptual losses associated with the plurality of bandwidth extended audio signals based on the hearing data set; and training, based on the plurality of perceptual losses, the bandwidth extension model.

The one or more first audio signals may be bandlimited audio data. The one or more audio signals which have been recorded in full band and subsequently been artificially bandlimited. The one or more audio signal data may be generated/recorded at different bandwidths, e.g., narrowband 4 kHz, wideband 8 kHz, super-wideband 12 kHz, or full band kHz. The one or more audio signal may have undergone different kinds of augmentation, such as adding one or more of the following: noise, room reverberation, simulated packet loss, or jammer speech.

The user hearing profile in the hearing dataset may be associated with physiological information, such as age or gender. The user hearing profile in the hearing dataset may be a hearing profile of the user of the audio device. The user hearing profile may be determined based on one or more tests carried out on the user of the audio device. The user hearing profile may be a generalized hearing profile associated with a certain age and/or gender. The hearing dataset may comprise one or more user profiles.

The perceptual loss may be determined in a plethora of manners. The perceptual loss may be understood as a loss function determining a perceptual loss. For example, the perceptual loss may be determined to maximize PRI. In the case of maximizing PRI, the bandwidth extension model would be trained to generate spectral content to maximize the PRI measure. The PRI would be calculated based on the user hearing profile. Perceptual loss may be a perceptual loss function which promotes training of the model which results in increased PRI and punishes training resulting in lowering of the PRI.

In another approach a masking threshold and a personalized bandwidth is determined based on the hearing data set. The masking threshold and the personalized bandwidth may be used to determine the audible range and levels associated with the hearing dataset, where the personalized bandwidth may be determined as the audible range based on the user hearing profile, and the audible levels may be determined as masked or unmasked components based on the user hearing profile. The audible range and levels may be used in determining masked and unmasked components of the generated plurality of bandwidth extending audio signals. The perceptual loss may then be determined so to train the bandwidth extension model to generate spectral content which is audible within the audible range.

In the literature different loss function have been proposed to consider psychoacoustics aspects. An example of such a loss function can be found in Kai Zhen, Mi Suk. Lee, Jongmo Sung, Seungkwon Beack and Minje Kim, "Psychoacoustic Calibration of Loss Functions for Efficient End-to-End Neural Audio Coding," in IEEE Signal Processing Letters, vol. 27, pp. 2159-2163, 2020. In the article they propose a perceptual weight vector in the loss function. In their proposed loss function (denoted by L), the perceptual weight vector (w) is defined based on the signal power spectral density (p) and the masked threshold (m) derived from psychoacoustic models. The loss function proposed is as follows $$L(w, X, \hat{X}) = \sum_f w(x_f - \hat{x}_f)^2$$

where f is the frequency index, $x_f$ and $\hat{x}_f$ are the f-th spectral magnitude component obtained from the spectral analysis of the input and output of the neural network, respectively, and X, $\hat{X}$ are the target clean time-frequency spectrum, estimated from neural network time-frequency spectrum, respectively, and w denotes the perceptual weight vector which is derived from p and m is as follows:

$$w = \log_{10}\left(\frac{10^{0.1p}}{10^{0.1m}} + 1\right)$$

It is intuitive from w that, if the signal's power is larger than m (p>m), then the model is enforced to recover this audible component.

The above is one manner of training of determining a perceptual loss, however, the perceptual loss may alternatively be determined by a perceptual loss function which promotes training of the bandwidth extension model resulting in increased unmasked components and punishes training resulting in increased masked components.

The perceptual loss may be determined by a plurality of different functions, such as linear, non-linear, log, piecewise, or exponential functions.

For the present invention, the loss function may in one embodiment only be applied within the audible range determined from the user hearing profile, furthermore, the masking may be determined from the user hearing profile, hence, personalizing the loss function based on the user hearing profile. Frequencies generated by the model outside the audible range determined from the user hearing profile may be discarded as irrelevant, and/or the model may be trained to punish the generation of frequencies outside the audible range.

Training of the bandwidth extension model may be carried out by modifying one or more parameters of the bandwidth extension model to minimize the perceptual loss, e.g., by minimizing/maximizing a loss function representing the perceptual loss. In the case of the bandwidth extension model comprising a neural network training may be performed by back propagation, such as by stochastic gradient descent aimed at minimizing/maximizing the loss function. Such back propagation will result in a set of trained weights in the neural network. The neural network could be a regression network or a generative network.

In a third aspect of the invention there is provided an audio device for personalized bandwidth extension, the audio device comprising a processor, and a memory storing instructions which when executed by the processor causes the processor to:

a. obtain an input microphone signal with a first bandwidth,
b. obtain a first user parameter comprising a result of a hearing test carried out on a user of the audio device and/or physiological information regarding the user of the audio device, such as gender and/or age,
c. determine based on the first user parameter a bandwidth extension model, wherein the bandwidth extension model comprises a trained neural network, wherein the trained neural network is trained according to the second aspect of the present disclosure and
d. generate an output signal with a second bandwidth using the determined bandwidth extension model.

BRIEF DESCRIPTION OF THE DRAWINGS

The above and other features and advantages of the present invention will become readily apparent to those skilled in the art by the following detailed description of example embodiments thereof with reference to the attached drawings, in which.

DETAILED DESCRIPTION

Figure 1:
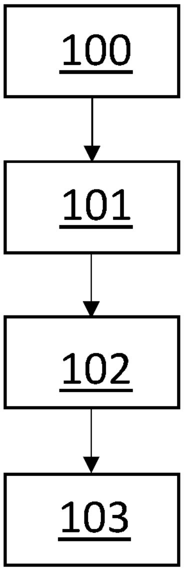
FIG. 1 schematically illustrates a flow chart of a method for personalized bandwidth extension in an audio device according to an embodiment of the disclosure.

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Referring initially to FIG. 1 which depicts a flow chart of a method for personalized bandwidth extension in an audio device according to an embodiment of the disclosure. In a first step 100 an input microphone signal is obtained. The input microphone signal has a first bandwidth. The input microphone signal may be obtained as part of an ongoing communication session happening between a near-end station and a far-end station. In a second step 101 a first user parameter is obtained. The first user parameter is indicative of one or more characteristics of a user of the audio device. The first user parameter may comprise physiological information regarding the user of the audio device, such as gender and/or age. The first user parameter may comprise a result of a hearing test carried out on the user of the audio device. The first user parameter may be obtained by retrieving it from a local storage of the audio device, such a local memory, e.g., a flash drive. In a third step 102 a bandwidth extension model is determined based on the obtained first user parameter. The bandwidth extension model may be determined by being generated based on the first user parameter. The bandwidth extension model may be determined by matching the first user parameter to a pre-generated bandwidth extension model from a plurality of pre-generated bandwidth extension models. Each of the plurality of pre-generated bandwidth extension models may have been pre-generated based on different user parameters. Matching of the first user parameter to the pre-generated bandwidth extension model, may be carried out associating each of the plurality of pre-generated bandwidth extension models with the one or more user parameters used for generating the pre-generated bandwidth extension model, and matching the first user parameter to the pre-generated bandwidth extension model which have been generated based on one or more user parameters which matches the most with the first user parameter. The determined bandwidth extension model comprises a trained neural network. In a fourth step 103 an output signal is generated by applying the determined bandwidth extension model to the input microphone signal. The output signal is generated with a second bandwidth. The determined bandwidth extension model may be applied by providing the input microphone signal as an input to the determined bandwidth extension model. The output of the determined bandwidth extension model may then be the output signal with the second bandwidth.

Figure 2:
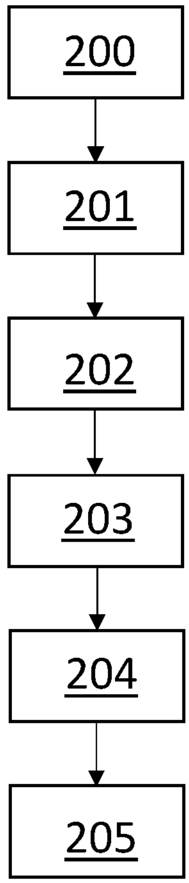
FIG. 2 schematically illustrates a flow chart of a method for personalized bandwidth extension in an audio device according to an embodiment of the disclosure.

Referring to FIG. 2 which depicts a flow chart of a method for personalized bandwidth extension in an audio device according to an embodiment of the disclosure. The method illustrated in FIG. 2 comprises steps corresponding to the steps of the method depicted in FIG. 1. In a first step 200 an input microphone signal is obtained. In a second step 201 a first user parameter is obtained. In a third step 202 a codebook is obtained. The codebook comprises a plurality of bandwidth extension models, each associated with one or more user parameters. The codebook may be obtained by retrieving it from a local storage on the audio device, alternatively, the codebook may be obtained by retrieving it from a cloud storage communicatively connected with the audio device. In a fourth step 203 the first user parameter is compared to the codebook. The comparison may be to determine which of the plurality of bandwidth extension model is the best match for the first user parameter, this may be done by comparing the first user parameter to the one or more user parameters associated with each of the bandwidth extension models. The result of the comparison may be a list of values, where each value indicates to what degree the first user parameter matches with a bandwidth extension model. In a fifth step 204 the bandwidth extension model is determined. The bandwidth extension model is determined based on the comparison between the codebook and the first user parameter. The determined bandwidth being a bandwidth extension model comprised in the obtained codebook. In a sixth step 205 an output signal is generated by applying the determined bandwidth extension model to the input microphone signal.

Figure 3:
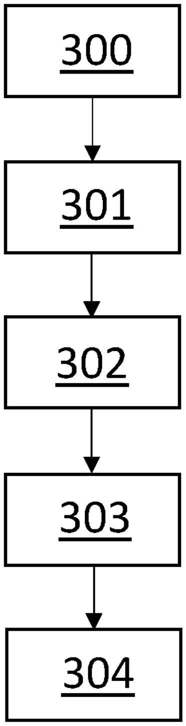
FIG. 3 schematically illustrates a flow chart of a method for personalized bandwidth extension in an audio device according to an embodiment of the disclosure.

Referring to FIG. 3 which depicts a flow chart of a method for personalized bandwidth extension in an audio device according to an embodiment of the disclosure. The method illustrated in FIG. 3 comprises steps corresponding to the steps of the method depicted in FIG. 1. In a first step 300 an input microphone signal is obtained. In a second step 301 a first user parameter is obtained. In a third step 302 the input microphone signal is analysed. The input microphone signal is analysed to determine a first bandwidth of the input microphone signal. In a fourth step 303 a bandwidth extension model is determined. The bandwidth extension model is determined based on the first user parameter and the determined first bandwidth. In some embodiment, the use of detecting the first bandwidth may be used in conjunction with an obtained codebook comprising a plurality of bandwidth extension models. The plurality of bandwidth extension models may be separated into different groups, each group corresponding to different bandwidths. Hence, a detected first bandwidth may be compared to the codebook to select the group from which a bandwidth extension model should be selected from. In a fifth step 304 an output signal is generated by applying the determined bandwidth extension model to the input microphone signal.

Figure 4:
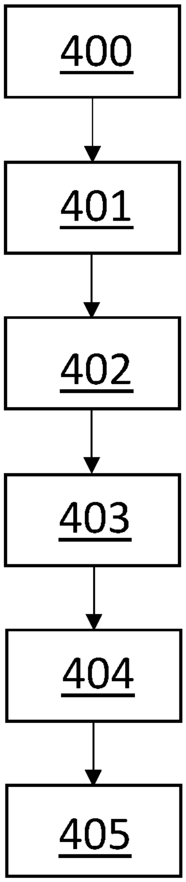
FIG. 4 schematically illustrates a flow chart of a method for personalized bandwidth extension in an audio device according to an embodiment of the disclosure.

Referring to FIG. 4 which depicts a flow chart of a method for personalized bandwidth extension in an audio device according to an embodiment of the disclosure. The method illustrated in FIG. 4 comprises steps corresponding to the steps of the method depicted in FIG. 1. In a first step 400 a communication connection with a far-end station is established. Establishing of the communication connection may be done as part of a handshake protocol between a far-end station and a near-end station. In a second step 401 a first user parameter is transmitted to the far-end station. The first user parameter may be transmitted to the far-end station as part of the handshake protocol. In a third step 402 the input microphone signal is received from the far-end station. The input microphone signal is received as an encoded signal. The input microphone signal may have been encoded according to an audio codec schematic. The encoded input microphone signal comprises the first user parameter. In a fourth step 403 the first user parameter is determined from the input microphone signal. In a fifth step 404 a bandwidth extension model is determined based on the determined first user parameter. In a sixth step 405 an output signal is generated by applying the determined bandwidth extension model to the input microphone signal. The fourth step 403, the fifth step 404, and the sixth step 406 is carried out as part of decoding process of the received encoded input microphone signal.

Figure 5:
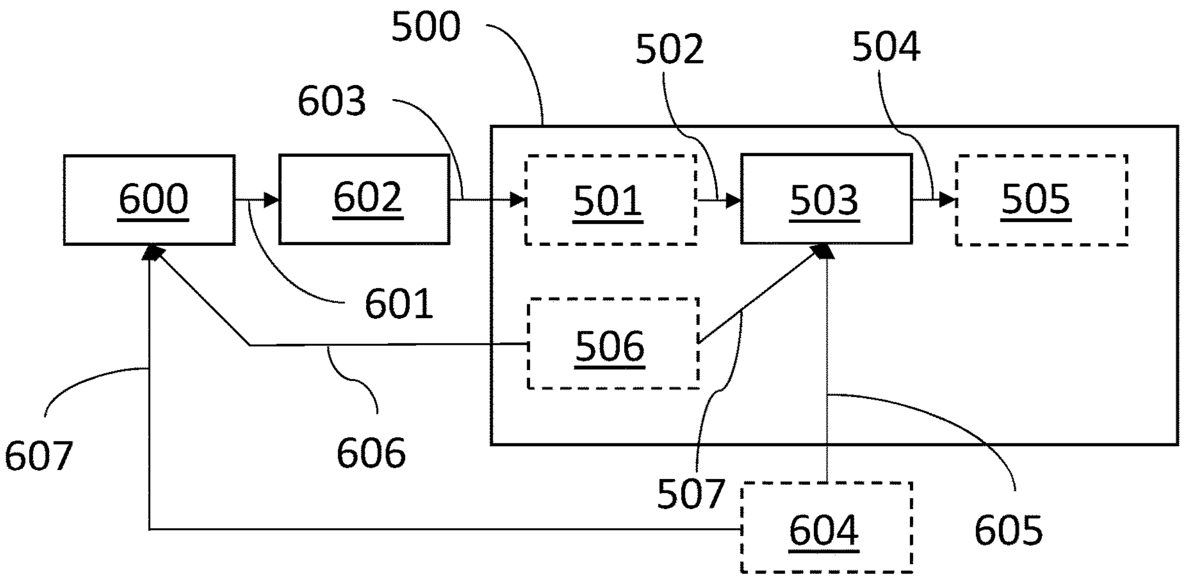
FIG. 5 schematically illustrates a communication system with an audio device according to an embodiment of the disclosure.

Referring to FIG. 5 which depicts a communication system with an audio device 500 according to an embodiment of the disclosure. The communication system comprises a far-end station 600 in communication with a near-end station 500. The near-end station 500 being the audio device 500, in other embodiments the audio device 500 may communicate with the far-end station via an intermediate device, for example, the intermediate device may be smartphone paired to the audio device 500. When setting up the communication connection between the far-end device 600 and the near-end device 500, the far-end device 600 may receive a first user parameter in the form of a signal 606, 607. The far-end device 600 may receive the signal 606, 607 regarding the first user parameter information from a cloud storage 604, or a local storage 506 on the audio device. The far-end device 600 transmits a TX signal 601. The TX signal 601 in the present embodiment being an encoded input microphone signal. The encoded input microphone signal may have been encoded with the first user parameter. The TX signal 601 is sent over a communication channel 602. The communication channel 602 may perform one or more actions to prevent the TX signal from degrading, such as packet loss concealment or buffering of the signal. At the near-end device 500 a RX signal 603 is received. The RX signal 603 may be the encoded input microphone signal transmitted as the TX signal 601 from the far-end station 600. The RX signal 603 may be received at a decoder module 501. The decoder module 501 being configured to decode the RX signal 603 to provide the input microphone signal 502. The decoder module 501 may also perform processing of the RX signal 603, such as noise suppression, echo cancellation, or bandwidth extension. A processor 503 of the audio device 500 obtains the input microphone signal 502 from the decoder module 501, in some embodiments the decoder module 501 is comprised in the processor 503. The processor 503 then obtains the first user parameter indicative of one or more characteristics of a user of the audio device 500. The first user parameter may be obtained from the decoder module 501, if the RX signal 603 was encoded with the first user parameter. Alternatively, the first user parameter 507 may be retrieved from a local memory 506 on the audio device, or be retrieved from a cloud storage 604 communicatively connected with the audio device 500. The processor 503 then determines a bandwidth extension model based on the first user parameter, and generates an output signal 504 with a second bandwidth using the determined bandwidth extension model. The output signal 504 may undergo further processing in a digital signal processing module 505. Further, processing may involve echo cancellation, noise suppression, dereverberation, etc. The output signal 504 may be outputted through one or more output transducers of the audio device. 500.

Figure 6:
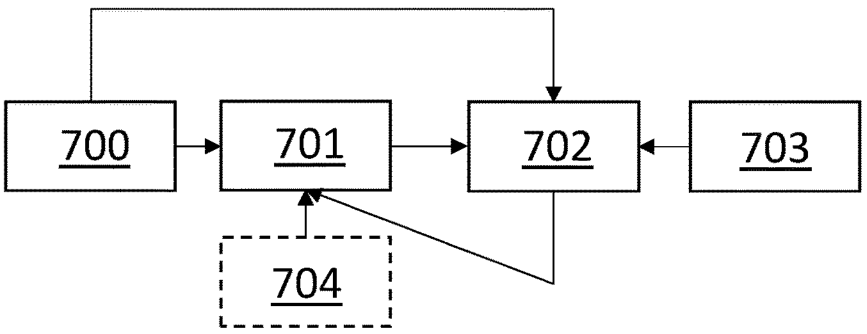
FIG. 6 schematically illustrates a block diagram of a training set-up for training a bandwidth extension model for personalized bandwidth extension according to an embodiment of the disclosure.

Referring to FIG. 6 which schematically illustrates a block diagram of a training set-up for training a bandwidth extension model for personalized bandwidth extension according to an embodiment of the disclosure. In the set-up an audio dataset 700 is obtained. The audio data set comprises one or more first audio signals with a first bandwidth. The audio data set 700 is given as input bandwidth extension model 701. The bandwidth extension model is applied to the one or more first audio signals to generate one or more bandwidth extended audio signals with a second bandwidth. The generated one or more bandwidth extended audio signals is given as input to a loss function 702. Furthermore, the audio data set 700 is also given as an input to the loss function 702. A hearing dataset 703 comprising a hearing profile is also obtained. The hearing dataset 703 is also given as an input to the loss function 702. Based on the hearing dataset 703, the one or more bandwidth extended audio signals, and the audio data set 700 one or more perceptual losses is determined by the loss function 702. The one or more perceptual losses determined is fed back to the bandwidth extension model to train the bandwidth extension model. In the case of the bandwidth extension model being a neural network, the perceptual losses may be back propagated through the bandwidth extension model to train the bandwidth extension model. To facilitate training of the bandwidth extension model 701 additional inputs may be given to the bandwidth extension model 701. In an embodiment, where the bandwidth extension model 701 comprises a neural network, pre-trained weights 704 may be given as an input to the bandwidth extension model 701 facilitate training of the bandwidth extension model 701.

It may be appreciated that FIGS. 5 and 6 comprise some modules or operations which are illustrated with a solid line and some modules or operations which are illustrated with a dashed line. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the example embodiments may be implemented at least in part by means of both hardware and software, and that several "means", "units" or "devices" may be represented by the same item of hardware.

The various example methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the scope of the claimed invention. The specification and drawings are, accordingly, to be regarded in an illustrative rather than restrictive sense. The claimed invention is intended to cover all alternatives, modifications, and equivalents.

Items:

1. A method for personalized bandwidth extension in an audio device, wherein the method comprises:
   a. obtaining an input microphone signal with a first bandwidth,
   b. obtaining a first user parameter indicative of one or more characteristics of a user of the audio device,
   c. determining, based on the first user parameter, a bandwidth extension model, and
   d. generating an output signal with a second bandwidth by applying the determined bandwidth extension model to the input microphone signal.
2. A method for personalized bandwidth extension in an audio device according to item 1, wherein the first user parameter comprises physiological information regarding the user of the audio device, such as gender and/or age.
3. A method for personalized bandwidth extension in an audio device according to item 1, wherein the first user parameter comprises a result of a hearing test carried out on the user of the audio device.
4. A method for personalized bandwidth extension in an audio device according to any of the preceding items, wherein the step c. comprises:

obtaining a codebook comprising a plurality of bandwidth extension models each associated with one or more user parameters, comparing the first user parameter to the codebook, and determining, based on the comparison between the codebook and the first user parameter, the bandwidth extension model.

5. A method for personalized bandwidth extension in an audio device according to any of the preceding items, comprising:

analysing the input microphone signal to determine the first bandwidth, and determining, based on the first user parameter and the determined first bandwidth, the bandwidth extension model.

6. A method for personalized bandwidth extension in an audio device according to any of the preceding items, wherein the bandwidth extension model comprises a trained neural network.

7. A method for personalized bandwidth extension in an audio device according to any of the preceding items, wherein the first user parameter is stored on a local storage of the audio device.

8. A method for personalized bandwidth extension in an audio device according to any of the preceding items, wherein the step a. comprises:

receiving the input microphone signal from a far-end station, wherein the received input microphone signal from the far-end station is an encoded signal, and wherein the steps b. to d. is carried out as part of decoding the input microphone signal from the far-end station.

9. A method for personalized bandwidth extension in an audio device according to item 8, comprising:

establishing a communication connection with a far-end station, transmitting the first user parameter to the far-end station, and receiving the input microphone signal from the far-end station, wherein the encoded input microphone signal comprises the first user parameter, and wherein step b) comprises:

determining the first user parameter from the received input microphone signal.

10. A computer-implemented method for training a bandwidth extension model for personalized bandwidth extension, wherein the method comprises:

obtaining an audio dataset comprising one or more first audio signals with a first bandwidth, obtaining a hearing dataset comprising a hearing profile, applying the bandwidth extension model to the one or more first audio signals to generate one or more bandwidth extended audio signals with a second bandwidth, determining one or more perceptual losses associated with the one or more bandwidth extended audio signals based on the hearing data set; and training, based on the one or more perceptual losses, the bandwidth extension model.

11. An audio device for personalized bandwidth extension, the audio device comprising a processor, and a memory storing instructions which when executed by the processor causes the processor to:

a. obtain an input microphone signal with a first bandwidth, b. obtain a first user parameter indicative of one or more characteristics of a user of the audio device, c. determine based on the first user parameter a bandwidth extension model, and d. generate an output signal with a second bandwidth using the determined bandwidth extension model.

The invention claimed is:

1. A computer-implemented method for training a bandwidth extension model for personalized bandwidth extension, wherein the method comprises:

obtaining an audio dataset comprising one or more first audio signals with a first bandwidth;

obtaining a hearing dataset comprising a hearing profile comprising one or more user profiles including a first user profile for a user of an audio device;

applying a bandwidth extension model to the one or more first audio signals to generate one or more bandwidth extended audio signals with a second bandwidth, determining one or more perceptual losses associated with the one or more bandwidth extended audio signals based on the first user profile;

determining a masking threshold and a personalized bandwidth based on the hearing dataset;

determining an audible range and audible levels based on the masking threshold and the personalized bandwidth; and training, based on the one or more perceptual losses, the bandwidth extension model, wherein the audible range is a personalized bandwidth for the user of the audio device, wherein the audible levels are used to determine masked and unmasked components of the generated bandwidth extending audio signals, wherein each of the one or more perceptual losses is a perceptual loss function, wherein the training of the bandwidth extension model includes training the bandwidth extension model to generate spectral content that is audible within the personalized bandwidth for the user of the audio device.

2. A method for personalized bandwidth extension in an audio device, wherein the method comprises:

a. obtaining an input microphone signal with a first bandwidth, b. obtaining a first user parameter comprising at least one of a result of a hearing test carried out on the user of the audio device or physiological information regarding the user of the audio device, including at least one of gender or age, c. determining, based on the first user parameter, a bandwidth extension model, wherein the bandwidth extension model comprises a trained neural network, and wherein the trained neural network is trained according to claim 1, and d. generating an output signal with a second bandwidth by applying the determined bandwidth extension model to the input microphone signal.

3. The method for personalized bandwidth extension in an audio device according to claim 2, wherein the step c. comprises:

obtaining a codebook comprising a plurality of bandwidth extension models each associated with one or more user parameters, comparing the first user parameter to the codebook, and determining, based on the comparison between the codebook and the first user parameter, the bandwidth extension model.

4. The method for personalized bandwidth extension in an audio device according to claim 2, comprising:

analysing the input microphone signal to determine the first bandwidth, and determining, based on the first user parameter and the determined first bandwidth, the bandwidth extension model.

5. The method for personalized bandwidth extension in an audio device according to claim 2, wherein the first user parameter is stored on a local storage of the audio device.

6. The method for personalized bandwidth extension in an audio device according to claim 2, wherein the step a. comprises:

receiving the input microphone signal from a far-end station, wherein the received input microphone signal from the far-end station is an encoded signal, and wherein the steps b. to d. is carried out as part of decoding the input microphone signal from the far-end station.

7. An audio device for personalized bandwidth extension, the audio device comprising:

a processor and a memory configured to store instructions which, when executed by the processor, causes the processor to:

a. obtain an input microphone signal with a first bandwidth, b. obtain a first user parameter comprising at least one of a result of a hearing test carried out on a user of the audio device or physiological information regarding the user of the audio device, including at least one of gender or age, c. determine, based on the first user parameter, a bandwidth extension model, wherein the bandwidth extension model comprises a trained neural network, and wherein the trained neural network is trained according to claim 1, and d. generate an output signal with a second bandwidth using the determined bandwidth extension model.

* * * * *